E. H. SHERBONDY.
UNIVERSAL JOINT.
APPLICATION FILED APR. 20, 1921.
1,414,377.
Patented May 2, 1922.
2 SHEETS—SHEET 2.
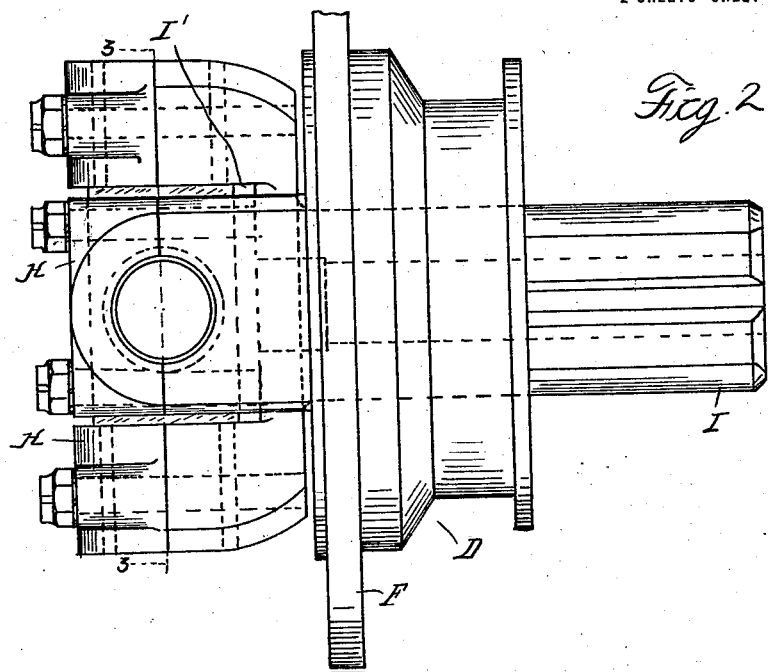
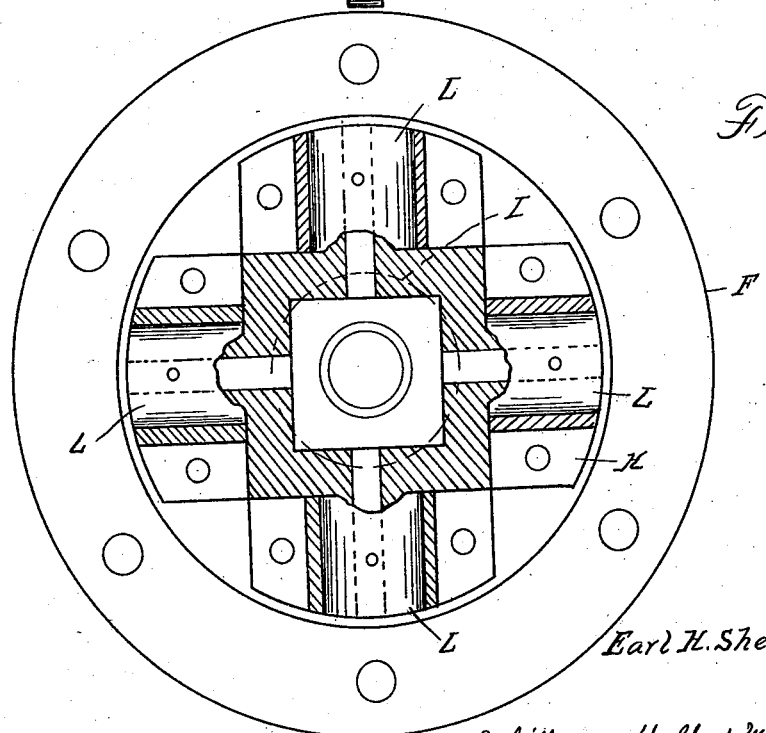
Inventor
Earl H. Sherbondy
By Whittemore Hulbert Whittemore
 & Belknap   Attorneys

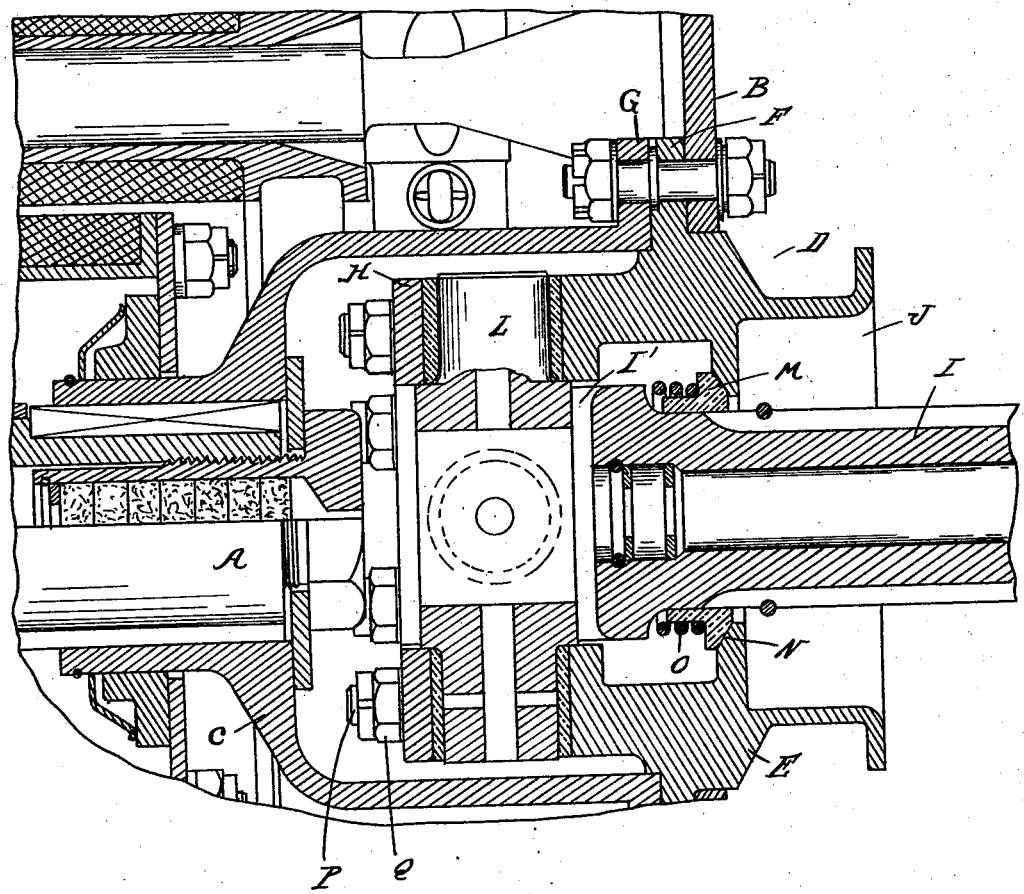

UNITED STATES PATENT OFFICE.

EARL H. SHERBONDY, OF DETROIT, MICHIGAN, ASSIGNOR TO SIDNEY D. WALDON, OF DETROIT, MICHIGAN.

UNIVERSAL JOINT.

1,414,377. Specification of Letters Patent. Patented May 2, 1922.

Application filed April 20, 1921. Serial No. 463,001.

*To all whom it may concern:*

Be it known that I, EARL H. SHERBONDY, a citizen of the United States of America, residing at Detroit, in the county of Wayne and State of Michigan, have invented certain new and useful Improvements in Universal Joints, of which the following is a specification, reference being had therein to the accompanying drawings.

The invention relates to universal joints adapted for various applications, but more particularly designed for use in propeller shafts of motor vehicles. It is the primary object of the invention to obtain a construction which may be located within smaller space limits and particularly within a longitudinal dimension. To this end the invention consists in the construction as hereinafter set forth.

In the drawings:

Figure 1 is a central longitudinal section through the joint as applied to a motor vehicle propeller mechanism;

Figure 2 is a plan view thereof; and

Figure 3 is a cross-section thereof.

One type of universal joint extensively used is that having a pair of bifurcated shaft members pivotally connected by a central member having trunnions arranged in transverse planes. For certain uses the length required is objectionable and with the present construction I have diminished the length by arranging the furcations on the same side of the longitudinal center of the joint.

In detail, A is a driving shaft, such as the engine shaft of a motor vehicle, and which as shown has mounted at the end thereof the brake drum B. C is the hub for this brake drum which is hollow and provides space for the universal joint D. This joint comprises a member E, which is peripherally flanged at F to engage a corresponding flange G on the hub C and which is provided with inwardly extending furcations H arranged within the space in the hub. I is the driven shaft which passes through a central aperture J in the member E sufficient in size to provide for the necessary angular adjustment. The inner end of the shaft I is bifurcated at I' and is arranged in a plane transverse to the plane of the furcations H. K is a cross member having trunnions L for engaging the furcations H and I'. M is a member sleeved upon the shaft I and having a spherical surface which is concentric with the center of the cross member K and engages a concentric spherical surface N on the member E. O is a spring for pressing the member M against the member N.

With the construction as thus far described, the center of the universal joint will be in the transverse plane of the cross member K and as the furcations H and I' both extend on the same side of this plane, the total length of the joint is less than where these furcations are upon opposite sides. This permits of placing the center of the joint closer to the engine casing and in otherwise condensing the construction.

To permit of readily assembling the construction the bearing for the trunnions L in the furcations are formed in sections with removable caps, and these caps are secured by studs P and clamping nuts Q. The peripheral flange F of the member E is attached to the adjacent flange G of the hub member C by bolts R which are also used for attaching the brake drum B. Thus to disconnect the driven shaft from the drive shaft the bolts R are removed and the driven shaft and universal joint may then be withdrawn from the hub C. The member M forms an oil tight and dust tight seal, while permitting free universal movement of the joint.

What I claim as my invention is:

1. A universal joint comprising a member trunnioned in transverse planes, and a pair of bifurcated members for respectively engaging the trunnions in the transverse planes and arranged on the same side of the common plane of said trunnions.

2. A universal joint comprising a member trunnioned in transverse planes, a pair of bifurcated members respectively engaging the trunnions in the transverse planes and arranged on the same side of the common plane of said trunnions, one of said bifurcated members being apertured for the passage therethrough of the other member with clearance for relative angular movement.

3. A universal joint comprising a hollow member, a member forming a cap for said hollow member and provided with spaced furcations projecting into the hollow, said member being centrally apertured, a bifurcated member arranged in a plane transverse to the plane of said furcations and having a shaft portion extending out through the central aperture in said cap member, and a cross member trunnioned in transverse planes for engaging said furcations.

4. A universal joint comprising a shaft, a hollow hub member mounted on said shaft, a member peripherally attached to said hollow hub member and provided with spaced furcations extending thereinto, said member being centrally apertured, a shaft member passing through said central aperture and having a bifurcated end arranged in a plane transverse to the plane of said furcations, a cross member trunnioned to engage the furcations in the transverse planes, and a member sleeved upon the inner shaft member having a spherical surface engaging a spherical seat on the surrounding member to form an oil tight and dust proof seal for the parts within the hollow hub.

In testimony whereof I affix my signature.

EARL H. SHERBONDY.